United States Patent

[11] 3,607,510

| [72] | Inventors | Pietro L. Serafino;<br>Pietro L. Culla, both of Torin, Italy |
|---|---|---|
| [21] | Appl. No. | 850,971 |
| [22] | Filed | Aug. 18, 1969 |
| [45] | Patented | Sept. 21, 1971 |
| [73] | Assignee | Diamond Shamrock Corporation<br>Cleveland, Ohio |
| [32] | Priority | Oct. 14, 1968 |
| [33] | | Italy |
| [31] | | 40450-A/68 |

[54] PLASTIC PIPE MANUFACTURE
5 Claims, 4 Drawing Figs.

[52] U.S. Cl. .................................................. 156/172,
156/188, 156/195
[51] Int. Cl. ........................................................ B65h 81/03
[50] Field of Search ........................................... 156/171,
172, 173, 185, 187, 188, 195

[56] References Cited
UNITED STATES PATENTS

| 2,723,705 | 11/1955 | Collins | 156/188 X |
|---|---|---|---|
| 3,068,133 | 12/1962 | Cilker et al. | 156/187 X |
| 3,068,134 | 12/1962 | Cilker et al. | 156/172 |
| 3,118,800 | 1/1964 | Snelling | 156/187 X |
| 3,306,797 | 2/1967 | Boggs | 156/173 X |
| 3,430,543 | 3/1969 | Cunningham | 156/188 X |
| 3,470,051 | 9/1969 | Meyer | 156/188 X |

Primary Examiner—Carl D. Quarforth
Assistant Examiner—Gary G. Solyst
Attorneys—Roy Davis, C. Thomas Cross, Timothy E. Tinkler, John J. Freer, Sam E. Laub, Neal T. Levin, Leslie G. Nunn, Jr., Helen P. Brush and John C. Tiernan ABSTRACT: Lightweight pipe having a plastic core and a fibrous wrapping is obtained by first coating the core with a composition containing a polymerizable liquid resin, typically a polyester resin, and an accelerator therefor. Thereafter fibrous material in bundles, impregnated with a substance such as the liquid resin composition, is applied to the resin-bearing core, along the axis of the core, with adjacent bundles being spaced apart. Catalyst-impregnated additional fibrous material is then wound about the intermediate fiber-and-resin-bearing article. This wound article is next wrapped with fibrous mats impregnated with the liquid resin composition or the like and is subsequently wrapped with plastic film. The resulting article has enhanced burst strength and is particularly useful in irrigation.

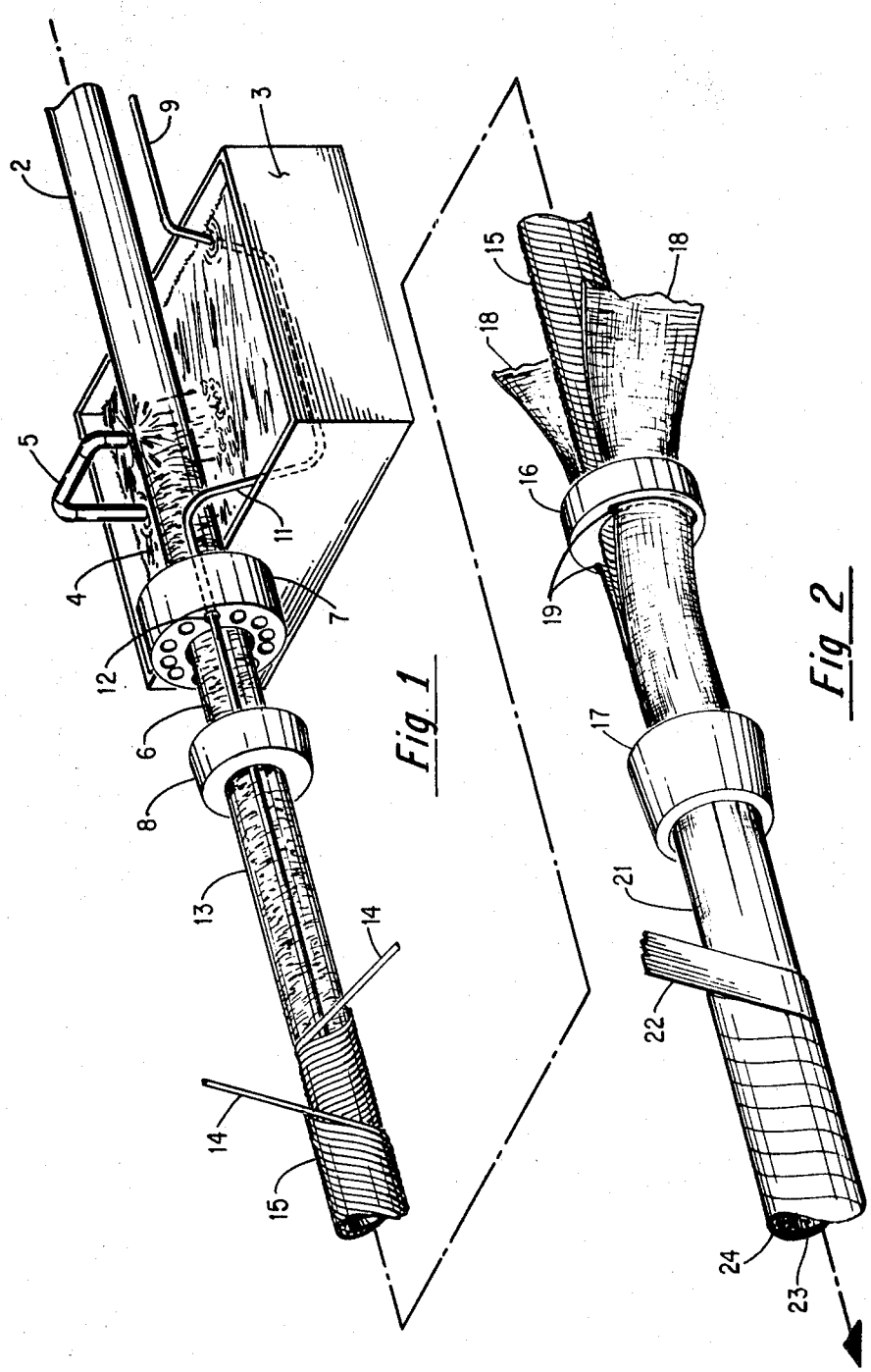

3,607,510

PLASTIC PIPE MANUFACTURE

BACKGROUND OF THE INVENTION

Plastic pipe cores have heretofore been partially covered in a direction along the axis of the pipe with bundles of fibrous material impregnated with polymerizable resin. The resulting article has then been wrapped in a direction about the pipe with additional, resin-impregnated fibrous material Spaces between adjacent fiber bundles first applied permitted contact between the pipe core and the wrapping fibers. To augment the application of resin to the article, the longitudinally applied bundles, or first fibers, could be coated with additional resin and subsequently, by winding the second fibers tightly around the fiber-bearing plastic pipe, resin from the first fibers further impregnated these second fibers. Thereafter the doubly wrapped article was wound with an outer finished wrap of plastic film and then passed through a furnace for curing the resin and completing the manufacture of the pipe.

Although the resulting article was somewhat satisfactory for enhancing the burst strength of the plastic pipe core, the fibrous wrapping was nevertheless brittle and was often easily damaged by minor impacts and rough handling. Moreover, despite the application of excess resin by coating of the fibers applied along the axis of the pipe, the total fibrous wrapping often separated from the plastic liner, particularly between the spacings separating adjacent first fiber bundles, and even though the second fibers were wrapped tightly around the pipe. Thus, the serviceable life of the resulting article could be severely impaired.

In previous practice the second fibers were often impregnated in discrete fibrous bundles with resin while under stress and these bundles were then applied about the pipe core. Because of this stress, the impregnation of the resin into the fibrous material was suppressed and thus even after tight winding of these fibers about the fiber-bearing core, an insufficient quantity of resin was transferred to these second fibers, thereby enhancing subsequent separation of components within the total wrapping. Furthermore, when any accidental interruption of the continuous formation of the finished article occurred, the curing furnace often deleteriously heated the portion of the article present in the furnace leading to thermal degradation and scrapping of such portion.

SUMMARY OF THE INVENTION

Therefore, it is an object of the present invention to prepare a wrapped pipe having enhanced bonding between fibrous wrapping material and a plastic core.

It is a further object of the present invention to enhance the impact resistance of the finished article and to obviate accidental burning or melting of the article and to during disruption in manufacturing of same by elimination of the furnace.

Other objects of the present invention include more desirable impregnation of resin for the longitudinal fibers and an extension of the useful resins to include those which would be deleteriously effected in a curing furnace.

Broadly, the present invention is directed to the method for continuously manufacturing pipe having a plastic core and a multiple fibrous wrapping. The method comprises forming a pipe from thermoplastic resin, coating the exterior of the pipe with a resinous mass comprising polymerizable liquid resin and an accelerator for such resin, impregnating first fibers with such a resinous mass, and applying a multitude of these impregnated fibers axially along the coated surface of the pipe. Continuing, the method then comprises impregnating a multitude of unstressed second fibers with a liquid composition comprising a catalyst for both the resin of the coating and the resin in the first fibers, and winding the impregnated second fibers under tension radially about the periphery of the pipe and axially applied fibers, thereby preparing an intermediate article; subsequently the process is continued by impregnating fibrous mat material with a resinous mass comprising polymerizable liquid resin and an accelerator for such resin and completely covering the intermediate article with impregnated mat material. The last portion of the method comprises permitting catalyzed polymerization of liquid resin present in the resulting mat-covered article by contact between catalyst-containing second fibers with resin-coated pipe plus resin-containing first fibers, as well as with resin-containing mat material, and applying under tension a radial wrapping of plastic film about the periphery of the mat-covered article.

The invention further relates to the manufactured article prepared by the broad method of the present invention and most particularly to lightweight plastic pipe of enhanced burst strength which is especially useful in irrigation.

The fibrous material applied first to the plastic core is impregnated as discrete fibrous bundles which are often referred to herein for convenience simply as the "first fibers." Hence, spacings between first fibers refer to spacings between discrete, impregnated bundles of fibrous material first applied to the core. In like manner, the term "second fibers" is used for convenience herein to refer to impregnated bundles of second fibers, and therefore, contact between adjacent bundles of second fibers to form a continuous winding is generally referred to herein simply as contacting the second fibers.

BRIEF DESCRIPTION OF THE DRAWINGS

FIG. 1 is a perspective view of a first portion of pipe manufacture according to the present invention.

FIG. 2 is a perspective view of a continuing portion of pipe manufacture according to the present invention and subsequent to the procedure of FIG. 1.

DESCRIPTION OF THE PREFERRED EMBODIMENTS

Figure 3:
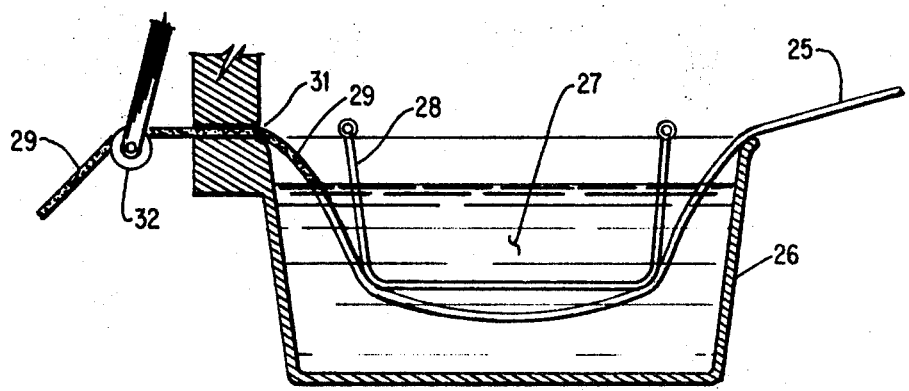
FIG. 3 is a sectional view showing the impregnation of relaxed fibrous material by submergence in a bath.

Referring to the figures, in FIG. 1 a plastic pipe 2 formed, for example, by conventional extrusion techniques not shown and advancing by means not shown travels over a tank 3 containing a resinous composition 4 comprising a polymerizable liquid resin and an accelerator for the resin. As the pipe 2 crosses the tank 3, resinous composition 4 from the tank 3 is pumped through a supply line 5 by means not shown and is expelled from the supply line down onto the pipe 2, thereby covering the exterior of the pipe 2 as it passes over the tank 3. Excess resinous composition 4 thus simply runs from the pipe 2 back into the tank 3. Advancing, resin-coated pipe 6 is guided by means not shown through a guide ring 7 and subsequently through a construction ring 8. In conjunction with the advancement of the pipe 2 bundles of first fibers 9, feeding from a source not shown and guided by means not shown, are fed into the resinous composition 4 in the tank 3 for impregnation therein. Thereafter resin-impregnated first fibers 11 pass through slots 12 present in the guide ring 7 and subsequently inside the construction ring 8 and are thereby snugly applied axially along the resin-coated pipe 6. Subsequently, fibers 14 impregnated with a composition comprising a catalyst for the liquid resin contained in the tank 3 are wound radially about the first-and-resin-bearing pipe 13 thus forming an intermediate article 15.

In FIG. 2, the advancing intermediate article 15 passes through a guide ring 16 and on through a subsequent constriction ring 17. Feeding from a source not shown, fibrous mat material 18 is guided through slots 19 in the guide ring 16 and then firmly around the intermediate wound article 15 by passage through the constriction ring 17. The completely mat-covered article 21 thus formed is subsequently advanced and thereafter radially wrapped with plastic film 22 under tension to prepare the finished wrapped article. In cutaway view, this article displays a plastic core 23 and a composite exterior fibrous and plastic wrapping 24.

Referring to FIG. 3, fibrous material 25 feeding from a source not shown and in unstressed condition, i.e., not under tension, enters an impregnation tank 26 containing a liquid composition 27 comprising a catalyst for polymerizable resin. Guide means 28 assure submergence of the material 25 well into the tank 26 and along a substantial portion of the tank 26. Resulting impregnated fibers 29 emerge from the tank 26, feed through an exit slot 31, and after issuing from the slot 31, pass over a pulley 32. The pulley 32 is secured by tension means not shown to afford a feed under tension of the continuing impregnated fibers 29. These fibers 29 are then radially wound under tension by means not shown around the fiber-and-resin-bearing pipe 13 as the impregnated fibers 14 shown in FIG. 1.

Figure 4:
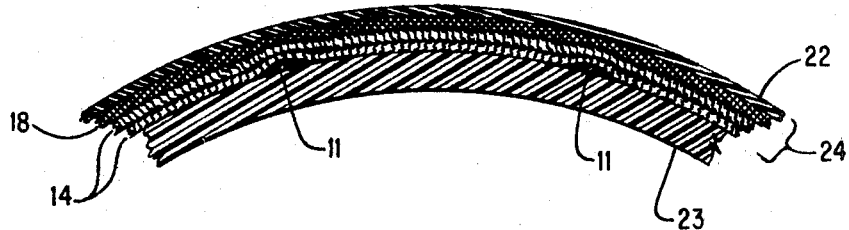
FIG. 4 is a partial view of an end section of a finished article representative of the present invention.

In FIG. 4 the plastic core 23 of the finished article contains a composite wrapping 24. A portion of this composite wrapping is supplied by resin impregnated bundles of first fibers 11 flattened onto the plastic core 23, for snug engagement therewith, by means of impregnated second fibers 14 wound firmly about the fiber-and-resin-bearing plastic core. At least a portion of these wound fibers 14 engage the core 23 at the spaces between adjacent bundles of first fibers 11. Fibrous, impregnated mat material 18 forms a subsequent fibrous layer over the impregnated wound fibers 14 and a finishing layer of plastic film 22 completes the structure of the article.

In addition to simply pouring the polymerizable resinous mass onto the plastic pipe the resinous mass can be sprayed or the pipe dip-coated or coated by any other conventional means for applying a resinous material to a pipe. The first fibers applied along the axis of the pipe can be impregnated in relaxed conditions in the manner of impregnation for the second fibers, and then drawn taut before application. These fibers are preferably spaced apart one from the other to allow tight engagement of the catalyst-impregnated second fibers with a portion of the resin-and-accelerator coated pipe. Thus, adjacent first fibers are preferably free from contact as applied, as well as after flattening by the winding of the second fibers. The first fibers can be passed through a resinous mass differing from the resinous mass applied to the pipe core so long as both are readily catalyzed by the liquid composition impregnating the second fibers. Also, the second fibers can be impregnated with a liquid composition containing a catalyst as well as some polymerizable liquid resin. The second fibers wound about the fiber-and-resin-bearing pipe can form one, or more than one, layer of fibrous covering. Generally for each layer of such second fibers adjacent wound fibers contact one another thereby forming a continuous winding around the core.

Moreover, several layers of mat material can be applied around the intermediate wound article, with a single mat completely enveloping such article. All layers of mats can be impregnated with a resinous mass comprising a polymerizable liquid resin and also a catalyst. However, where several layers of mat material are used, alternate layers can be impregnated with resinous material containing polymerizable liquid resin plus accelerator and intermediate mats can be impregnated with catalyst or catalyst plus polymerizable liquid resin. By tightly applying the mats of each layers, catalyst-containing liquid and liquid resin are squeezed into contact for catalyzed polymerization of the resin. The mat material can be applied upon the intermediate article in a direction along the axis of the intermediate article as depicted in FIG. 2, or can be spirally wrapped about such article, or can be applied in a combination of such wrappings where more than one layer of mat material is applied. After application of the mat material the finishing plastic film can be applied to form more than one layer of film wrapping, e.g., to enhance weatherability of the finished article.

The pipe core can be formed by any method suitable for the manufacture of pipe from thermoplastic material, e.g., by extrusion of such material, and typically can be prepared from a resinous composition containing polyvinyl chloride resin. The polymerizable liquid resin for all of the resinous masses, i.e., those for coating the pipe core and impregnating fibrous substances, can be a polyester resin, for example a solution of a condensation polymer of phthalic acid plus maleic anhydride condensed with propylene glycol, which polymer is dissolved in a compound containing a polymerizable $CH_2=C<$ group, such as styrene. These resins can include those which will slightly attack the pipe core, e.g., have a slight etching effect on the pipe core thereby enhancing the bonding between the pipe core and fibrous substances engaging the polymerizable mats contained on the core.

Where a polyester resin is used as a polymerizable liquid resin a typical accelerator for such resin can be cobalt naphthanate and a typical catalyst for such a combination of polyester resin and accelerator can be methyl ethyl ketone peroxide. Polymerization of the liquid resin contained in the resinous mass can be taking place during the production of the finished article, for example, after the catalyst-impregnated second fibers are wound around the fiber-and-resin-bearing pipe, catalyzed polymerization of the resin then present can be taking place during the application of the impregnated mat material. Additionally, after application of impregnated mat material, polymerization of all unpolymerized resin then present can be taking place during the application of additional mat material and/or during wrapping of the mat-covered article with the finished plastic film.

The fibrous material for the axially applied first fibers, or for the radially wound second fibers, and as well for the fibrous mat material can be any conventional synthetic or natural fibers used in pipe manufacture, e.g., asbestos fibers, glass fibers, polypropylene fibers, or the like. Preferably, for efficiency and economy the plastic film used in the outer wrapping for preparing the finished article is simply polyethylene.

It is to be understood that, although the invention has been described with specific reference to particular embodiments thereof, it is not to be so limited, since changes and alterations therein may be made which are within the full intended scope of this invention as defined by the appended claims.

1. The method of forming pipe having a plastic core and a multiple fibrous wrapping thereon, thereby preparing pipe having enhanced resistance to rupture from internal pressure, which method comprises:

forming a pipe from thermoplastic resin;

coating the exterior surface of said pipe with a resinous mass comprising polymerizable liquid resin and an accelerator for said resin;

impregnating a multitude of continuous first fibers with a resinous mass comprising polymerizable liquid resin and an accelerator for said resin, and applying resulting impregnated fibers axially along the coated surface of said pipe;

impregnating a multitude of unstressed continuous second fibers with a liquid composition comprising a catalyst for both the resin of said coating and the resin in said first fibers, and winding the impregnated second fibers under tension radially about the periphery of said pipe and axially applied fibers, thereby preparing an intermediate article;

impregnating fibrous mat material with a resinous mass comprising polymerizable liquid resin and an accelerator for said applying said mat in a direction along the axis of said intermediate article with impregnated mat material;

curing the liquid resins of the first fibers, second fibers, and mat material by catalytic polymerization through contact between catalyst-containing second fibers with resin-coated pipe plus resin-containing first fibers as well as with resin-containing mat material; and applying under tension a radial wrapping of plastic film about the periphery of said mat-covered article.

2. The method of claim 1 wherein said resinous mass for said coating is poured down onto the advancing core, at least a portion of said first fibers are impregnated in unstressed condition, are axially applied under tension, and are spaced apart one from the other along resin-bearing plastic core, and adjacent second fibers contact one another thereby forming a continuous, fibrous winding about said pipe and axially applied fibers while contacting said pipe between spaced apart first fibers.

3. The method of claim 1 wherein the pipe and axially applied fibers are wound with more than one layer of second fibers, the second fibers are impregnated with liquid material comprising polymerizable liquid resin and a catalyst for said resin, and said mat material is impregnated with a catalyst for the resin contained in said mat material.

4. The method of claim 1 wherein said intermediate article is wrapped longitudinally along said article with more than one layer of fibrous mat material, and at least alternate layers of said mat material are impregnated with a liquid composition containing a catalyst for the resin in said material, whereby resin in the wrapped mat material contacts catalyst for said resin.

5. The method of claim 1 wherein the resinous mass of said coating and the resinous mass impregnating said first fibers are the same, the intermediate article is covered with mat material during polymerization of resin present in said article, and the mat-covered article is wrapped with plastic film during polymerization of resin present in said mat-covered article.